(12) United States Patent
Fitzsimmons

(10) Patent No.: US 8,687,775 B2
(45) Date of Patent: Apr. 1, 2014

(54) SYSTEM AND METHOD FOR GENERATING AND FACILITATING COMMENT ON AUDIO CONTENT

(75) Inventor: Jeff Fitzsimmons, Fox Point, WI (US)

(73) Assignee: Harqen, LLC, Milwaukee, WI (US)

( * ) Notice: Subject to any disclaimer, the term of this patent is extended or adjusted under 35 U.S.C. 154(b) by 785 days.

(21) Appl. No.: 12/144,404

(22) Filed: Jun. 23, 2008

(65) Prior Publication Data

US 2009/0316863 A1    Dec. 24, 2009

(51) Int. Cl.
*H04M 1/64* (2006.01)

(52) U.S. Cl.
USPC .................. 379/88.17; 379/68; 379/88.13

(58) Field of Classification Search
USPC .......... 379/88.11, 41, 51, 67.1–71, 85, 88.13, 379/88.17, 88.26, 207.01, 207.02; 455/413, 455/466, 55.16, 552.1; 704/260, 270
See application file for complete search history.

(56) References Cited

U.S. PATENT DOCUMENTS

| | | | |
|---|---|---|---|
| 6,246,871 B1 * | 6/2001 | Ala-Laurila | 455/413 |
| 6,516,203 B1 * | 2/2003 | Enzmann et al. | 455/556.1 |
| 2002/0067805 A1 * | 6/2002 | Andrews | 379/67.1 |
| 2002/0118798 A1 * | 8/2002 | Langhart et al. | 379/67.1 |
| 2008/0207233 A1 * | 8/2008 | Waytena et al. | 455/466 |
| 2009/0055189 A1 * | 2/2009 | Stuart et al. | 704/270 |
| 2009/0221321 A1 * | 9/2009 | Fields et al. | 455/552.1 |
| 2009/0319273 A1 * | 12/2009 | Mitsui et al. | 704/260 |

\* cited by examiner

*Primary Examiner* — Md S Elahee

(74) *Attorney, Agent, or Firm* — Boyle Fredrickson, S.C.

(57) ABSTRACT

A computer-implemented system and method for generating audio content using a telephony system. The method includes receiving a telephone call initiation request through a computer implemented graphical interface, initiating a telephone call to a selected telephone number, recording at least a portion of the telephone call to generate audio content, and posting the generated audio content on the computer implemented graphical interface to allow one or more users to access the generated audio content.

12 Claims, 4 Drawing Sheets

SYSTEM AND METHOD FOR GENERATING AND FACILITATING COMMENT ON AUDIO CONTENT

FIELD

The present invention relates to systems and methods for facilitating comment on user-submitted media. Specifically, the present invention relates to a system and method for receiving, storing, and allowing retrieval of stored audio content and facilitating comment thereupon.

BACKGROUND

The sharing of user generated content has become one of the more interesting uses for the World Wide Web. User generated content can include videos, audio files such as user produced music, photography, etc. The user generated content may be generated by a user using a computer and one or more peripherals such as a video camera, a microphone, a camera, etc. The user generated content may be converted into a digital format and uploaded to a content sharing website. After uploading, the user generated content may be shared such that it can be accessed by other users, referred to herein as content viewers.

Content viewers access the user generated content on the content sharing website for many different reasons, such as entertainment, creative inspiration, sharing memories, etc., and often provide comments on the user generated content that they access. The provided comments may include constructive feedback, a rating, a vote indicating approval, etc. Often the shared content is displayed on a web page hosted by the content sharing website. The web page may be configured to include the user generated content, information regarding the content, information regarding the user, and the submitted comments. The displayed comments may include voting results, a ranking, text entries submitted by content viewers, etc.

Conventional content sharing sites require that the user have the necessary peripheral to capture the user generated content. These peripherals are often expensive, such as digital cameras, digital video cameras, microphone set ups, etc. Further, the content sharing sites require that the user have sufficient knowledge to convert their content to a digital or other format that is appropriate for uploading and sharing.

What is needed is a system and method for implementing an automated phone system integrated with a social networking website to allow users to record, upload, and share audio content using a standard telephone system. What is further needed is such a system and method configured to allow users to provide comment on the audio content and ranking the audio content based on the comments that have been provided.

SUMMARY

A computer-implemented system and method for generating audio content using a telephony system is described. The method includes receiving a telephone call initiation request through a computer implemented graphical interface, initiating a telephone call to a selected telephone number, recording at least a portion of the telephone call to generate audio content, and posting the generated audio content on the computer implemented graphical interface to allow one or more users to access the generated audio content.

The method may further include providing a comment function on the graphical user interface to allow the one or more users to provide a comment associated with the generated audio content. The comment function may be configured to implement an incremental rating system ranking the generated audio content relative to other audio content displayed on the computer-implemented graphical user interface. The comment function may also be configured to allow users to initiate at least a second telephone call to provide additional generated audio content to be associated with the generated audio content. The comment function may also be configured to increase or decrease a user rating associated with the creator of the generated audio content.

The method may further include associating geographical information with the generated audio content based on the location from which the telephone call originated.

The method may further include receiving one or more tags and content filtering information to be associated with the generated audio content through the graphical user interface.

Other features and advantages of the invention will become apparent to those skilled in the art from the following detailed description and accompanying drawings. It should be understood, however, that the detailed description and specific examples, while indicating the preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

Figure 1:
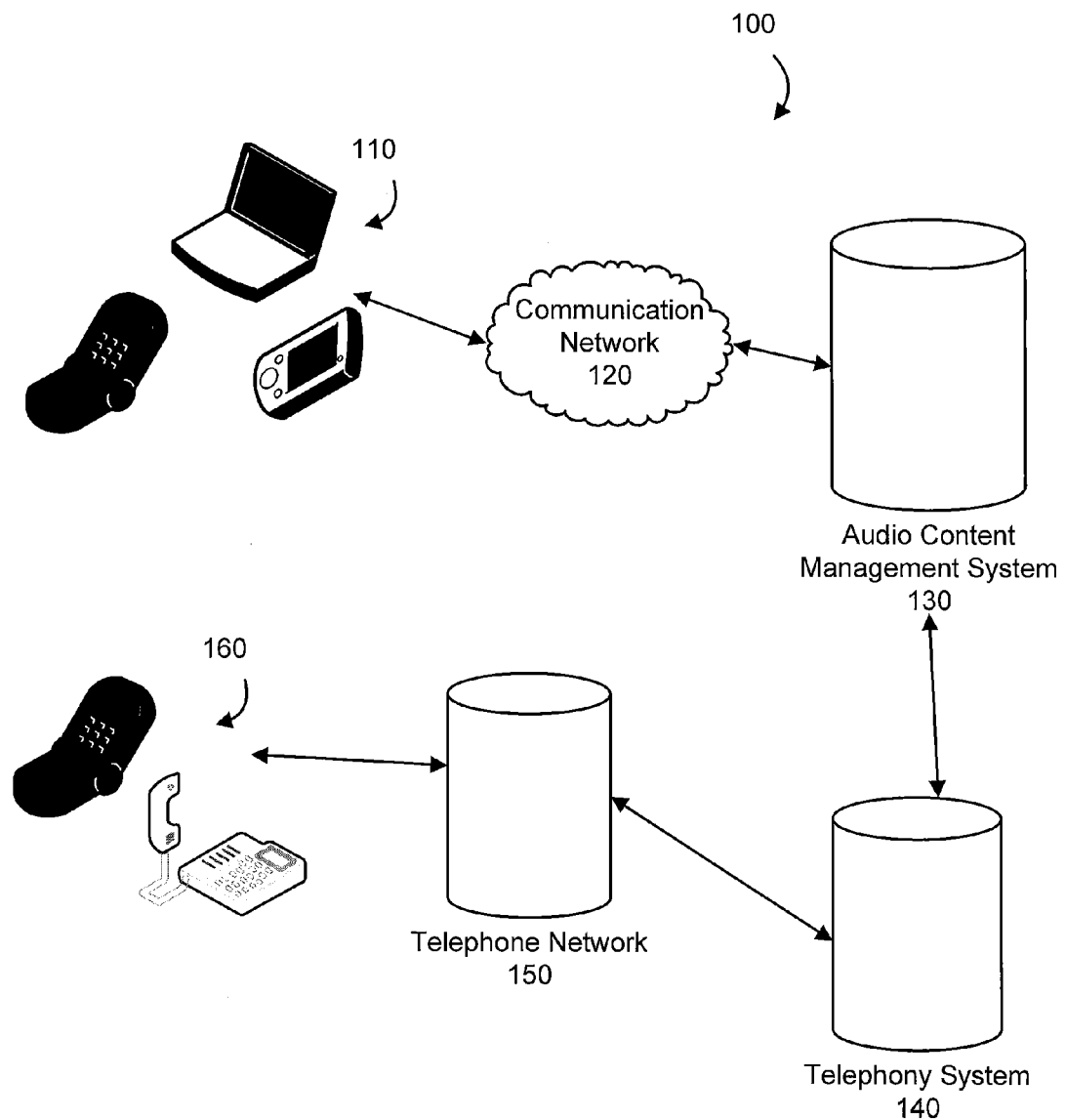
FIG. 1 is a user generated audio content system for receiving, storing, and allowing retrieval of user generated audio content using a telephony system, according to an exemplary embodiment.

Before explaining embodiments of the invention in detail, it is to be understood that the invention is not limited in its application to the details of construction and the arrangement of the components set forth in the following description and illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION

Referring now to FIG. 1, a user generated audio content system 100 for receiving, storing, and allowing retrieval of user generated audio content using a telephony system is shown, according to an exemplary embodiment. System 100 is configured to include a user computing system 110 connected to a user generated audio content management system 130 through a communication network 120, such as the Internet. Audio content management system 130 is further connected to a telephone network 150 through a telephony system 140 configured to allow system 130 to initiate audio communication with a user through a user telephone device 160. Although system 100 is shown and described as including particular systems and devices in a particular configuration, it should be understood that system 100 may alternatively include more, less, and/or a different configuration of devices and systems configured to implement the functionality described herein.

Computer system 110 is representative of the wide range of large and small computer systems that are used in computer networks of all types. For example, computer system 110 may be a desktop computing system, a laptop communication system, a handheld computing device, a smart phone, or any other web-enabled computing device configurable to allow a user to access system 130 using communication network 120 and initiate an audio content generation method, described below in further detail with reference to FIGS. 2-4. Although only a single computing system 110 is shown in FIG. 1, it should be understood that the method and system described herein may be used to connect system 130 to a larger number of different systems 110 and device 160.

Communication network 120 is intended to be representative of the complete spectrum of computer network types including Internet and internet-like networks. Communication network 120 may be utilized to allow communication between system 130 and any number of computer systems, of which computer system 110 is representative.

Audio content management system 130 may be implemented using any of a variety of computing systems configured to implement a web server function and a telephony system service. Audio content management system 130 is configured to implement functionality allowing a user to access system 130 using their computer system 110 to initiate a method of obtaining user generated audio content using telephony system 140, described below in detail with reference to FIGS. 2 and 3.

Telephony system 140 is a system configured to allow system 130 to initiate and record a telephone conversation with a user through a device 160 to obtain the user generated audio content using computer telephone integration CTI software and telephony hardware. CTI software enables computer system 130 to know about and control phone functions such as making and receiving voice, fax, and data calls with telephone directory services and caller identification. According to one exemplary embodiment, telephony system 140 and system 130 may be implemented using a single computing system.

The CTI software may be configured as an interface between system 130 and the telephone network 150. The software translates commands entered by a user into a website hosted by system 130 into commands that trigger telephony hardware. This functionality allows system 130 to call users (or allows the users to call system 130), and initiate system 130 to record the audio being provided through a device 160.

Telephony hardware may include any type of hardware configured to allow system 130 to connect to a plurality of devices 160 over a telephone network 150. The hardware may consist on Session Border Controller (SBC) clusters, routing clusters and media gateways, as are generally known in the art.

Telephone network 150 may be any telephone network such as the Public Switched Telephone Network (PSTN), the network of the world's public circuit-switched telephone networks. Telephone network 150 is configured to allow audio and data to be transmitted and received between system 130 and devices 160.

User telephone device 160 may include any type of device configured to allow a user to receive a telephone call from system 130. Exemplary devices may include, but are not limited to telephones, mobile phones, VOIP (or similar) devices, etc. Although a single connection and two devices 160 are shown, it should be understood that system 130 may be configured to allow connections to a large number of devices 160 through a large number of telephone connections.

In operation, system 100 is configured to allow users to initiate an audio content generation process using a telephony system as will be described in further detail below. The audio content may be provided for comment, rating, etc. in a social network setting. The audio content may further be appended to by other users using system 100.

According to one exemplary embodiment, system 130 may be configured to implement a joke telling social network website in which jokes recorded using telephony system 140 as user generated audio content are received and stored using system 130. System 130 may be further configured to allow users to listen to jokes, share jokes, rank or provide comments on jokes, etc. Sharing jokes may include instructing system 130 to send an email including an audio file, embedding an audio file player on their blog, website, or other social networking site, etc.

Figure 2:
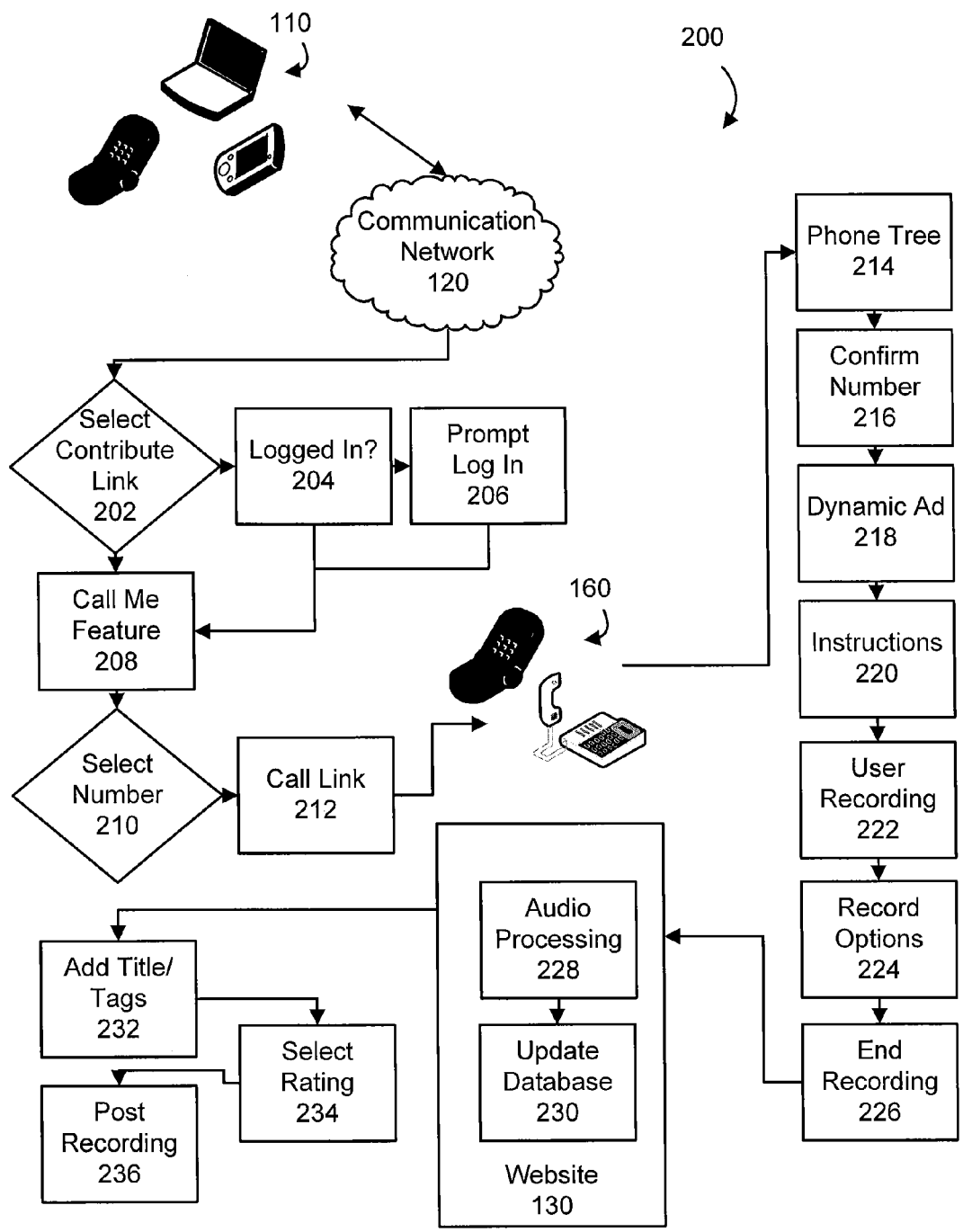
FIG. 2 is a flowchart illustrating a method for allowing a user to submit user generated audio content using a computing system and a telephone device, according to an exemplary embodiment.

Referring now to FIG. 2, a flowchart 200 illustrating a method for allowing a user to submit user generated audio content using their computing system 110 and phone device 160 is shown, according to an exemplary embodiment. According to an exemplary embodiment, system 130 may be configured to implement a registration function, where users that are registered are able to access additional features, be recognized by system 130, etc. Flowchart 200 illustrates a method where the user has registered or created an account through website 130. Accordingly, system 130 can associate a telephony session with the user information and automatically post recorded audio to the user's account.

The method described in flowchart 200 may be generally implemented by the user through a website hosted by system 130 and displayed on the user's computing system 110 over the communication network 120. The website may include a plurality of differing webpages based on the functionality being accessed by the user. Exemplary functionality may include submitting audio content, reviewing the audio content of other users, providing comments, account initiation and management, etc.

In a step 202, the user selects a contribute link on the web page being displayed on their computing system 110. Upon receiving the contribute selection, system 130 may be configured to determine whether the user has previously established an account with system 130 and is logged on to their account in a step 204. If the user does not have an account or is not logged on, system 130 may be configured to initiate a log in procedure or account creation procedure as needed in a step 206.

In a step 208, a contribution web page may be displayed to the user including an "Initiate Call" link. Upon selection of the link, the user can be provided with a listing a previously entered telephone numbers associate with the user account in a step 210. The user may also be provided with an option to enter a new phone number. The user is provided with instructions that the phone number provided is the number of a phone at the users current location on which they are prepared to receive a phone call from system 130.

In a step 212, the user initiates the phone call from their computing device 110 by selecting a "make call" link. Selecting the link prompts system 130 to connect to the selected telephone number through telephony system 140. The user telephone device receives the call from system 130 to create an audio connection to system 130. System 130 may be configured to display one or more status messages based on the status on the audio connection. Exemplary messages may include "calling," "answered," "recording," "call completed," etc.

Once the user is connected to system 130 through telephony system 140, system 140 may be configured to guide the user through a phone tree in a step 214 which provides the user with a variety of recorded messages and options that will facilitate generation and posting of the user generated audio content.

In a step 216, upon answering of the call by the user, system 130 may be configured to confirm the telephone number, particularly where system 130 has not previously accessed the phone number. System 130 may be configured to play a recorded message asking the user to press a specified key to confirm that system 130 may use the telephone number.

Upon confirmation, system 130 may be configured to play a recorded welcoming message. The welcoming message may be configured to include a system identification, advertising in a step 218, instructions in a step 220, promotional information, account information, etc.

Following the provided instructions, the user may record their user generated audio content in a step 222 by speaking normally into their telephone device 160. The user generated audio content may include a wide variety of subject matter as managed by system 130. Examples may include jokes, stories, reports on current conditions, comments on a particular subject matter, etc.

Once the user is finished recording, system 130 may be configured to provide the user with a plurality of options for handling the user generated audio content in a step 224. Option may include reviewing, re-recording, submitting, etc. Upon completion of the user audio content generation, the user may end the phone call in a step 226.

System 130 may be configured to process the user generated audio content in a step 228. Processing the audio content may include converting the recorded audio content to the website presentation format, cleaning the audio content to remove white noise, background noise, etc., posting the user generated audio content on the website, etc. System 130 may further add the processed user generated audio content to a database associated with system 130 in a step 230.

Following posting of the generated audio content, system 130 may be configured to prompt the user for additional information regarding the recorded audio through a web page displayed on their computing system 110 in a step 232. The additional information may include a title for the generated audio and one or more tags. A tag may be an individual word that describes the content of the audio content to make is easier for content viewers to locate the recorded audio using a search function. For example, where the recorded audio is a joke, exemplary tags may include ("bar," "golf," etc.) The tag and other additional information may alternatively be provided during the phone call and converted to text by a human representative, speech to text recognition software, etc.

The user may further be prompted to provide a content filtering rating to categorize the content according to the maturity level recommended to listen to the content in a step 234. Speech to text software may also be utilized to recognize pre-determined keywords that will automatically place the content into specified categories. System 130 may also be configured to allow content viewers to submit recommendations that content be moved to or from a category based on the content. After receiving an initial rating, the audio content may be posted in a step 236 such that the content may be accessed using system 130. The content may then be reviewed, voted on, commented on, shared, embedded, etc.

Figure 3:
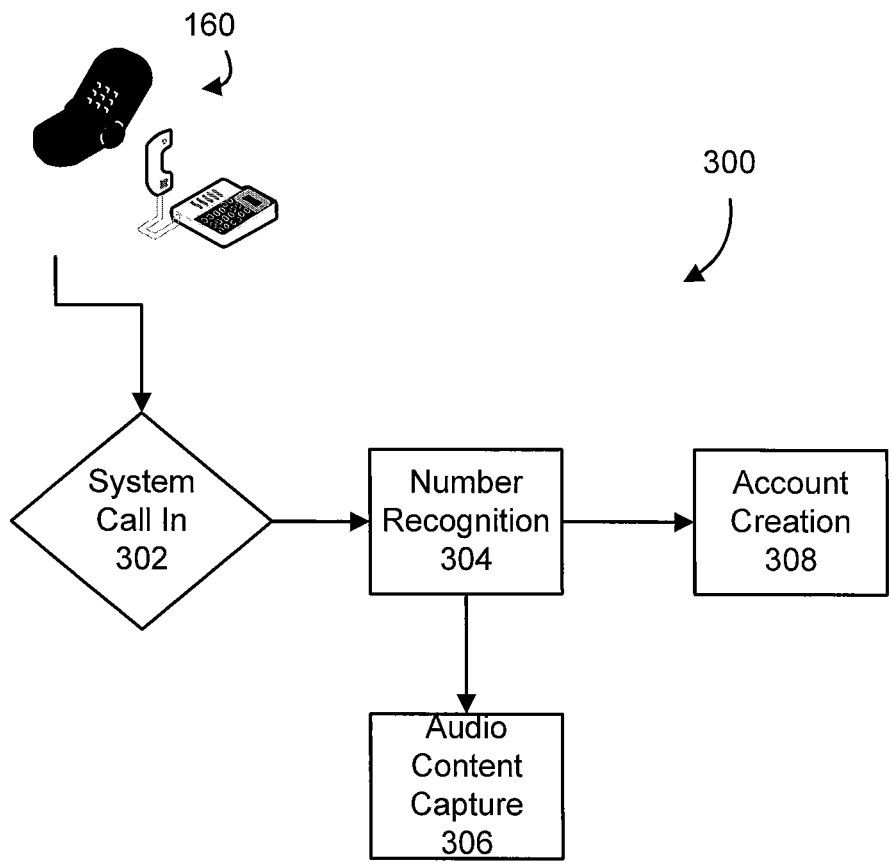
FIG. 3 is a flowchart illustrating a method for providing user generated audio content by a registered user of the system of FIG. 1 using a telephone device, according to an exemplary embodiment.

Referring now to FIG. 3, a flowchart 300 illustrating a method for providing user generated audio content for a registered user of system 130 using a telephone device is shown, according to an exemplary embodiment. Where a user has previously registered and created an account using system 130, system 130 may be configured to recognize an incoming telephone number as being associated with the user account. Accordingly, system 130 may be configured to allow a user with a previously generated account and a phone number associated with that account to record audio content from a device using that phone number such that the generated audio content will automatically be associated with that account.

In a step 302, the user users their telephone device 160 to call into system 130 using a direct phone number associated with telephony system 140. Alternatively the user may access system 130 using a short code, a text link such as email, SMS, etc., or other means to initiate the audio content capture process.

In a step 304, system 130 checks to determine whether the initiating phone number is recognized by system 130. If the phone number is not recognized, system 130 may be configured to prompt the user to access the website of system 130 to create an account in a step 308. Alternatively system 130 may be configured to implement a method of storing the user generated audio content subject to subsequent account creation by the user. If the user has not registered or created an account through system 130, system 130 may be configured to send a temporary access code to a mobile device when the creation of the user generated audio content is completed. The user can later access system 130 to create an account, enter the temporary access code and have the created audio content associated with their account.

In a step 306, if the number is recognized, system 130 may initiate the phone tree and implement the audio content capture process, audio content processing, tagging, content filtering, and web site posting described above with reference to steps 218 through 236 in FIG. 2. The tag entry and content filtering may be implemented by the user using their telephone keypad, a mobile device keyboard, speech to text, recognition, etc. Alternatively, steps 232 though 236 may be postponed until the user has an opportunity to utilize a computing device 110 to access system 130 and complete these steps.

Although a particular series of steps are shown and described in a particular order in the flowcharts shown in FIGS. 2 and 3 and described above, it should be understood that the methods described with reference to these flowchart may be implemented using more, fewer, and/or a different ordering of the steps to perform the functions described therein.

Figure 4:
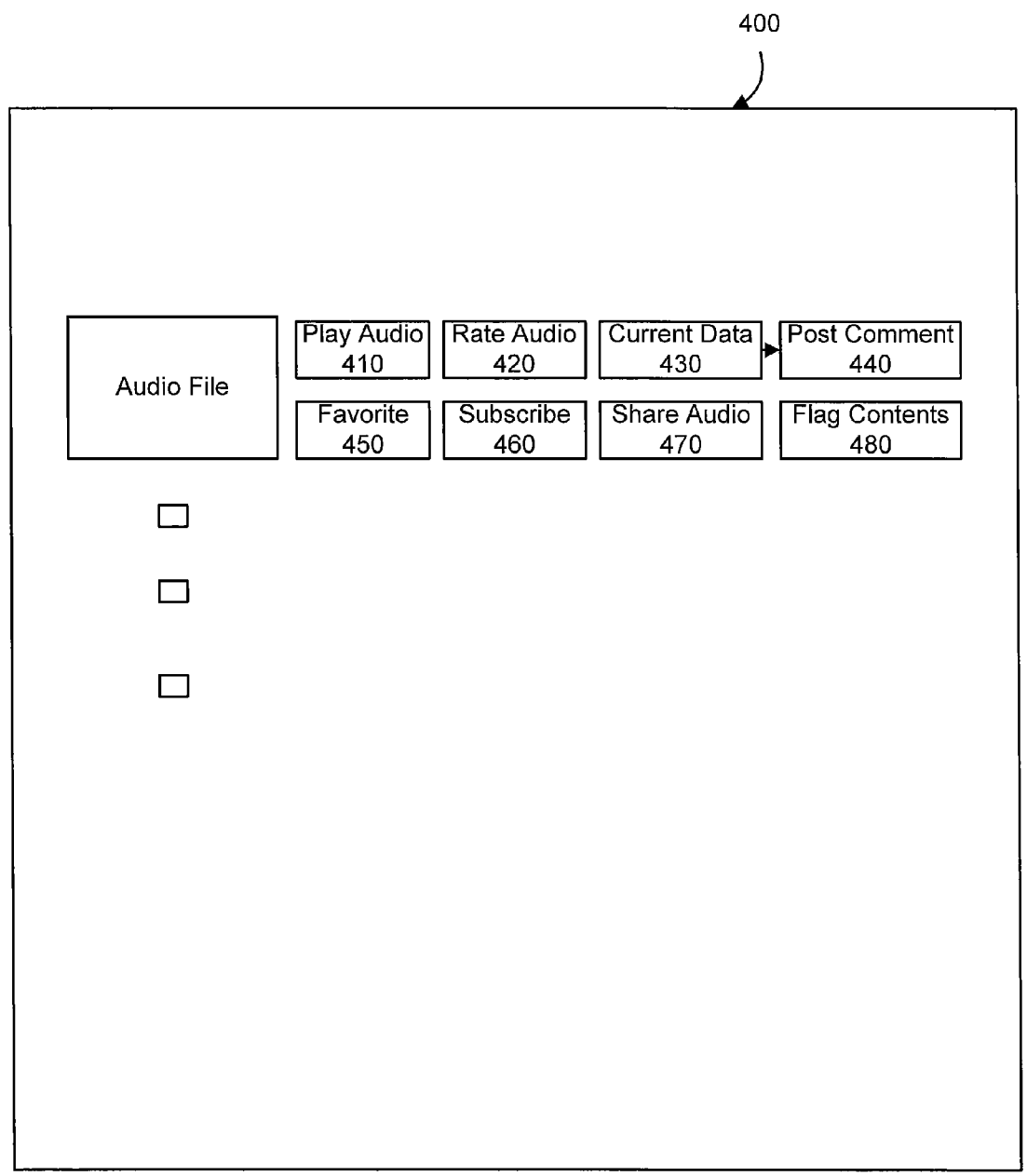
FIG. 4 is a flowchart illustrating a method for allowing a non-registered user to supply user generated audio content using a telephone device.

Referring now to FIG. 4, a graphical interface 400 configured to implement audio content review and social networking components is shown, according to an exemplary embodiment. Graphical interface 400 may be implemented using a web page created using hypertext markup language (HTML) or other language codes to implement the functions described hereinbelow.

Graphical interface 400 may be configured to display a plurality of user generated audio content files, the display including a link to the audio file that will launch an audio player and play back the audio file. The display may further include the title and content filter rating supplied by the creator, a current rating, associated user comments, etc. Each audio content file may be associated with a plurality of links including a play audio link 410, a rate audio link 420, a view current data link 430, a post comment link 440, a favorite material selection link 450, a subscription link 460, a share link 470, and a flag material link 480. Each of the described functions and methods may be associated with one or more user selectable icons, hyperlinks, text entry fields, images, text displays, embedded applications, etc.

Play audio link 410 may be configured to allow users to listen to the audio file using a player presented by system 130. The audio file may alternatively be played through embedded players designed to reside on personal websites, blogs, social networking sites, etc. Audio files may also be played through desktop widgets, mobile devices, cellphones, etc.

Rate audio link 420 may be configured to allow content viewers to rate the quality of the audio content. The rating system 130 may include any of a variety of rating systems and methods. For example, system 130 may be configured to implement an incremental rating system such that each vote increases the ranking of the selected audio content relative to other audio content associated with system 130. Accordingly, the content viewers using system 130 will be able to collectively identify quality audio content for other content viewers.

View current data link 430 may be configured to allow a content viewer to display any data associated with the selected audio content, including both user generated information and information generated by system 130 and/or other content viewers. The displayed data may include, but is not limited to, how many times the audio content has been played by content viewers, the average rating provided by content viewers, etc. The displayed data may further include statistics regarding the creator of the audio content. The statistics may be based on other created audio content in addition to the current audio content. The statistics may include a user rating taking into account all of the user's activities on system 130 both positive and negative. For example, a user rating may increase for repeatedly generating audio content that is favorably received by content viewers and decrease if the user engages in abusive activities. The user rating may be utilized by system 130 to convey one or more benefits dependent on the user rating. Other statistics may include a listing of the number of audio content files submitted, a listing of the number of subscriptions associated with the user, etc.

The current data may further include a time and/or geographical stamp to be associated with the audio file. This information may be supplied by the user or generated automatically by system 130 and, for example, a GPS enabled cellular device. Advantageously, geographically and time stamped audio files may be particular useful for categorizing the audio files. For example, a historian may be particularly interested in stories reflected in audio content files following some historic event such as an election, a natural disaster, etc. Alternatively, the audio content files may be associated with a particular sports venue, such as a golf hole, where users are able to submit audio files about a particular golf hole on a particular day.

Post comment link 440 allows a content viewer to provide feedback on the selected audio content. The feedback may include text comments, a scale rating, selection of a positive or negative rating, etc.

According to an exemplary embodiment, the posted comment link 44 may also allow a user to provide their comments as a second audio content file to be associated with the selected audio content file. Advantageously, allowing follow on audio content files may allow users to tell their own stories related to a particular audio content file. Examples can include genealogical information where all family members are invited to tell stories regarding a great grandmother, etc. Different and conflicting audio content may be submitted regarding a particular event to describe a historical event, etc.

Favorite material selection link 450 allows a user to specify that the audio content is a "favorite." A listing of favorites may be associated with the user account for that user such that the user can easily retrieve their favorite audio content later. System 130 may utilize this indication as a positive factor for the creator's user rating.

Subscription link 460 allows a user to indicate that they are particularly interest in audio content generated by the creator of the current audio content. As creators become more popular, user can join a "fan club" associated with the creator through the subscription function. System 130 may be configured to automatically notify subscribers when a creator has submitted new audio content.

Share link 470 allows a user to select from a plurality of methods for sharing the selected audio content. Sharing methods may include multiple social networking submission buttons that allow users to easily submit links to individual audio content files to multiple social networking websites or social news aggregations sites. Sharing may also include emailing links to individual audio content files, either to an individual identified by a specific email address or to an entire address book associated with the user.

Flag material link 480 allows a user to suggest a modification to the information associated with the audio content file. The modification may include additional tags, content filter indicators, etc.

Referring now to FIG. 5, an audio content management system 500 may be implemented to allow an implementation of system 130 that is adapted for a particular use, such as a promotional tool, a turnkey, an automated contest, etc. System 500 may be configured to include a branded audio content player, a customizable web page, custom greeting to be provided during the audio capture method, advertising attached as a prelude to the audio content files, etc.

Although the system and method described herein was describe, in at least some exemplary embodiment, with reference to a joke telling and rating website, one of ordinary skill in the art could understand that the described system and method may be utilized for a number of applications. One exemplary application may include storytelling where users tell stories over telephony system 140 and other users provide feedback, including possibly additional audio content regarding the stories. Another application may include soliciting audio commentary from consumer regarding a particular product, retailer, restaurant, etc. Other users could then review the audio content files as a way of determining trust level for the product or service being reviewed. Yet others application may include news reporting, life commentary, etc.

Various alternatives are contemplated as being within the scope of the following claims particularly pointing out and distinctly claiming the subject matter regarded as the invention. It is also to be understood that, although the foregoing description and drawings describe and illustrate in detail one or more preferred embodiments of the present invention, to those skilled in the art to which the present invention relates, the present disclosure will suggest many modifications and constructions, as well as widely differing embodiments and applications without thereby departing from the spirit and scope of the invention.

It is claimed:

1. A computer-implemented method for generating audio content using a telephony system, comprising:
   (a) receiving over the internet at a first computing system connected to the internet, a call initiation request from a second computing system remote from the first computing system and also connected to the internet, the call initiation request being received through a computer implemented graphical interface implemented as a website on the internet by the first computing system, the call initiation request including a telephone number;
   (b) in response to receipt of the call initiation request, initiating at the first computer system a telephone call over a telephone network to the telephone number included in the call initiation request;
   (c) recording at the first computing system at least a portion of the telephone call to generate audio content including the voice of a person answering the telephone call initiated at the first computer system; and
   (d) posting on the internet, by the first computing system the generated audio content on the computer implemented graphical interface of the website, to allow one or more users other than the person answering the telephone call to access and play back the generated audio content and hear the voice of the person answering the telephone call using the computer implemented graphical interface of the website;
   (e) ranking the audio content relative to other audio content according to comments on the audio provided by the users.

2. The method of claim 1, further including providing a comment function on the graphical user interface of the website to allow the one or more users to provide a comment following the play back of the generated audio content and for the comment to be accessed by others using the graphical user interface of the website.

3. The method of claim 2, wherein the comment function is configured to allow a given user to initiate over the internet via the first computing system at least a second telephone call to the given user to provide additional generated audio content to be associated with the generated audio content and posting the additional generated audio content on the internet by the first computer to allow one or more users to access the additional generated audio content using the computer implemented graphical interface of the website.

4. The method of claim 2, wherein the comment function is configured to increase or decrease a given user rating based on comments associated with the generated audio contented created by the given user.

5. The method of claim 1, further including associating at the first computing system geographical information with the generated audio content based on a location from which the recorded portion of the telephone call originated and posting the geographical information for access by other users using the computer implemented graphical interface of the website.

6. The method of claim 1, further including receiving at the computer implemented graphical interface of the website one or more tags and content filtering information associated with the generated audio content and modifying a display of the generated audio content through the graphical user interface of the website based on the one or more tags and content filtering information.

7. A computer-implemented system for generating audio content using a telephony system, comprising:
   a telephony system configured to initiate a telephone call based on instructions received from a computer system; and
   an audio content management system configured to perform a plurality of steps to generate audio content using the telephony system, including
   (a) receiving over the internet at a first computing system connected to the internet, a call initiation request from a second computing system remote from the first computing system also connected to the internet, the call initiation request being received through a computer implemented graphical interface implemented as a website on the internet by the first computer, the call initiation request including a telephone number;
   (b) in response to receipt of the call initiation request, initiating at the first computer system a telephone call over a telephone network to the telephone number included in the telephone call initiation request;
   (c) recording at the first computing system at least a portion of the telephone call to generate audio content including the voice of a person answering the telephone call initiated at the first computer system; and
   (d) posting on the internet, by the first computing system, the generated audio content on the computer implemented graphical interface of the website, to allow one or more users other than the person answering the telephone call to access and play back the generated audio content and hear the voice of the person answering the telephone call the generated audio content using the computer implemented graphical interface of the website;
   (e) ranking, by an incremental rating system, the audio content relative to other audio content according to comments on the audio provided by the users.

8. The system of claim 7, wherein the management system is further configured to provide a comment function on the graphical user interface of the website to allow the one or more users to provide a comment following the play back of the generated audio content and for the comment to be accessed by others using the graphical user interface of the website.

9. The system of claim 8, wherein the comment function is configured to allow a given user to initiate over the internet via the first computing system at least a second telephone call to the given user to provide additional generated audio content to be associated with the generated audio content and posting the additional generated audio content on the internet by the first computer to allow one or more users to access the additional generated audio content using the computer implemented graphical interface of the website.

10. The system of claim 8, wherein the comment function is configured to increase or decrease a given user rating based on comments associated with the generated audio contented created by the given user.

11. The system of claim 7, wherein the management system is further configured to associate at the first computing system geographical information with the generated audio content based on a location from which the recorded portion of the telephone call originated and to post the geographical information for access by other users using the computer implemented graphical interface of the website.

12. The system of claim 7, wherein the management system is further configured to receive at the computer implemented graphical interface of the website one or more tags and content filtering information associated with the generated audio content and to modify a display of the generated audio content through the graphical user interface of the website based on the one or more tags and content filtering information.

* * * * *

UNITED STATES PATENT AND TRADEMARK OFFICE
CERTIFICATE OF CORRECTION

| | | |
|---|---|---|
| PATENT NO. | : 8,687,775 B2 | Page 1 of 1 |
| APPLICATION NO. | : 12/144404 | |
| DATED | : April 1, 2014 | |
| INVENTOR(S) | : Fitzsimmons | |

It is certified that error appears in the above-identified patent and that said Letters Patent is hereby corrected as shown below:

IN THE CLAIMS

Claim 1, column 9, line 20, after "system" insert -- , --;

Claim 4, column 9, line 48, delete "contented" and substitute therefore -- content --;

Claim 10, column 10, line 50, delete "contented" and substitute therefore -- content --.

Signed and Sealed this
Twenty-ninth Day of July, 2014

Michelle K. Lee
*Deputy Director of the United States Patent and Trademark Office*